United States Patent [19]
Verdier

[11] 3,884,286
[45] May 20, 1975

[54] WHEEL RIMS
[75] Inventor: Henri Verdier, Beauregard-l'Eveque, France
[73] Assignee: Compagnie Generale des Etablissements Michelin raison sociale Michelin & Cie, France
[22] Filed: July 17, 1974
[21] Appl. No.: 489,106

[30] Foreign Application Priority Data
July 30, 1973 France .............................. 73.27921

[52] U.S. Cl. ................. 152/375; 152/378; 152/379
[51] Int. Cl. ............................................... B60c 5/00
[58] Field of Search ........................... 152/375–383; 301/39 R, 39 T, 63 R, 65, 95–98

[56] References Cited
UNITED STATES PATENTS
| 893,075 | 7/1908 | Hopkinson | 152/375 |
| 2,840,133 | 6/1958 | Billingsley | 152/381 A |

Primary Examiner—M. Henson Wood, Jr.
Assistant Examiner—D. W. Keen
Attorney, Agent, or Firm—Brumbaugh, Graves, Donohue & Raymond

[57] ABSTRACT

A wheel rim for tubeless tires has a lateral mounting groove plugged with a removable annular lining of stretchable, flexible material having a specified radial profile and compressibility.

9 Claims, 6 Drawing Figures

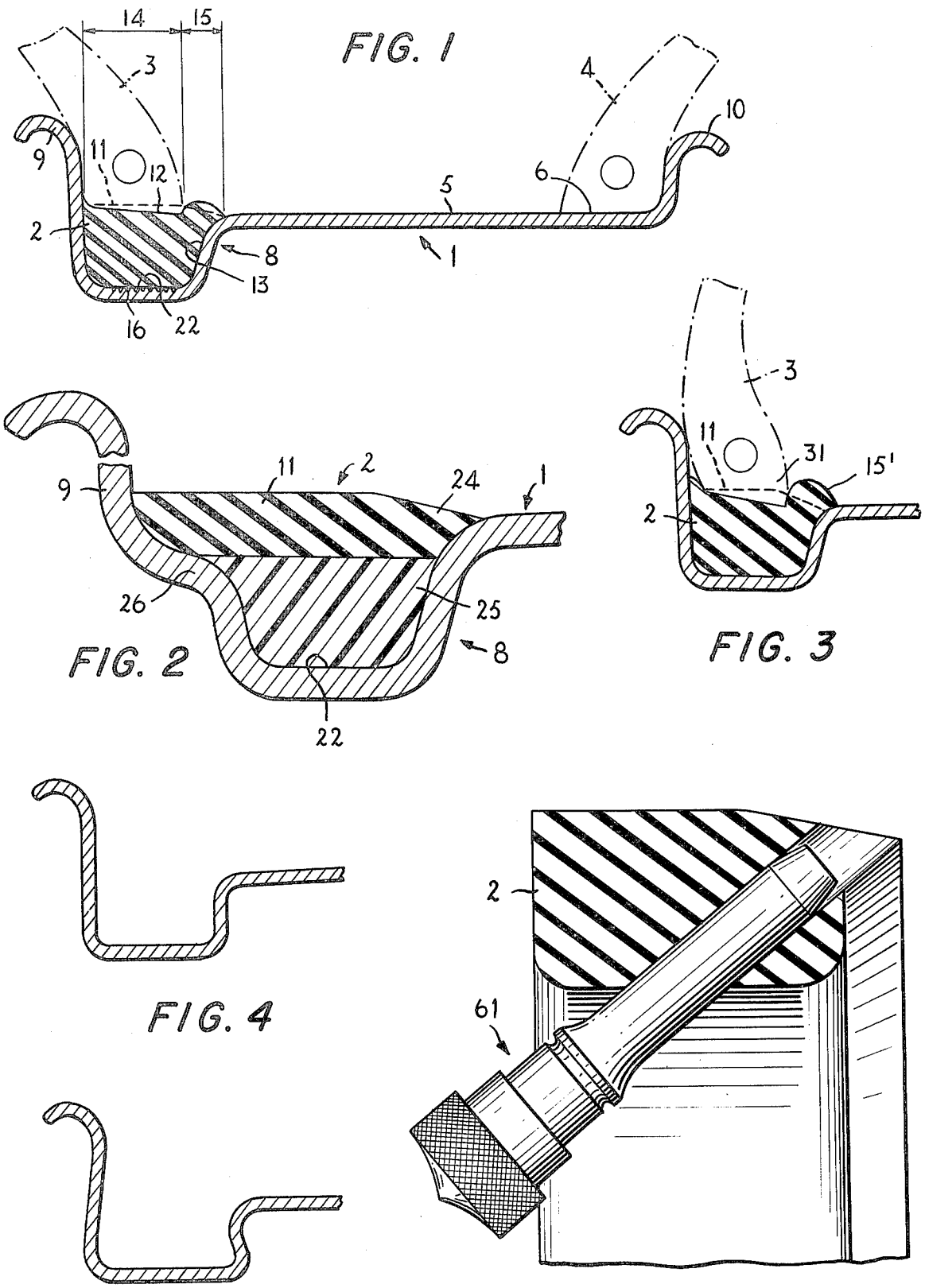

WHEEL RIMS

The present invention relates to improvements in wheels intended to be provided with tires. More particularly, the invention concerns wheel rims adapted to be provided with tires of the tubeless type.

Such rims ordinarily have a base provided with a substantially central well (drop-center rims) which is of smaller diameter. On the two sides of the well there is arranged a bead seat which is extended towards the outside by a flange which terminates in a hook. The beads of the tire are wedged on the seats and rest against the flanges. They thus assure the tightness of the pneumatic cavity and the firm connection of the tire to the wheel.

As is known, the well of the rim base serves only temporarily upon the mounting and removal of tires. Between these two operations its presence is not only useless but disturbing. On the one hand it encroaches on the space radially inward to the rim in which the braking members are housed, and on the other hand it aggravates the consequences of the spontaneous loosening of the beads as a result of certain conditions of travel.

For this reason, it has been proposed heretofore to shift the rim well towards the outer rim flange and to cover it by means of a removable device, for instance a rigid band forming an extension of the profile of the rim base. This solution has a number of drawbacks resulting essentially from the device for covering the well. As a matter of fact, this device does not assure tightness of the pneumatic cavity and does not prevent the loosening of the bead. Furthermore, it has a tendency to leave its housing on the rim prematurely under the effect of centrifugal force. Finally, its positioning, its locking in place and its removal are difficult.

Thus the object of the present invention is to create such an arrangement in combination with a rim which can overcome the essential drawbacks which have just been enumerated.

The wheel rim in accordance with the present invention, having a base and two seats for tire beads, each seat being extended by a flange, is provided with a mounting well adjacent one flange and a removable annular device filling the well. This rim is characterized by the fact that:

a. the mounting well is contiguous one of the flanges and forms an extension thereof, b. the filling device is a stretchable, flexible lining having a radial profile such that the lining applies itself against the walls of the mounting well and forms the seat for a tire bead and an extension of this seat to the rim base, and that at least the bead seat and its extension which are formed by the lining are compressible without variation in the total volume of the lining.

The annular lining in accordance with the invention has a large surface in contact with the well, which prevents any displacement of the lining and guarantees the holding fast of the bead of the tire in circumferential direction.

The mounting well which forms the housing for the lining preferably has a radial profile with an axial width increasing from the bottom of the well towards the bead seat, its minimal width at the bottom being equal at least to the width of the base of the bead of the tire. In order to prevent the lining from twisting or turning on itself in the mounting well, the wall of said well in contact with the lining is provided with means known per se, for instance circumferential striations.

The cross section of the lining, instead of being simply trapezoidal, is preferably in the shape of an L lying on its side, which increases the surface in contact with the rim. Furthermore, the corresponding cross section of the mounting well introduces an additional rib in the immediate vicinity of the rim flange, that is to say, in an area of the rim which is severely stressed by dynamic stresses.

Since the lining rests against the surface of the well, the lining is wedged in the well under the clamping effect produced by the bead of the tire. This wedging has several consequences.

The first is that the bead of the tire can neutralize the tendency of the lining to increase in diameter as a function of the speed of travel.

The second is that the lining in its turn is capable of neutralizing the attempts at the loosening of the bead, the lining increasing in volume and therefore in diameter along the free inner area which is not in contact with the base of the bead but in contact with the inflation air. The reason for this is that at least the radially outward portion of the lining is compressible without change in volume. Preferably the interior development of the base of the bead of the tire will be selected less than the external development of the area of the lining intended to form the bead seat. This in such a manner that the compression of said area produces, within the free contiguous portion in contact with the pneumatic cavity, a circumferential safety protuberance or hump similar to that with which drop-center rims intended to receive tubeless tires are customarily provided. The said circumferential protuberance furthermore increases in diameter as a function of the speed, which increases its effectiveness.

The third consequence of the interwedging between the bead, the lining and the mounting well makes it possible to have the lining effectively serve as a sealing joint for the pneumatic cavity. The lining will preferably be made of one or more rubbery or plastic materials, possibly reinforced. In general, the structure of the lining may be single or composite, provided that the lining is flexible, stretchable (so that it can be easily mounted and removed), compressible without variation of volume on at least its outer face, and applies itself suitably in the well.

Another advantage resulting from the structure of the lining in accordance with the invention is that it produces a pressure which is both uniform and determinable by means of a greater or lesser clamping of the tire bead on its seat. The seating and the stability of the bead on its seat are improved thereby.

Due to its flexibility, a lining consisting of a single piece without connecting device is preferred, the essential factor being that any compression of the portion of the lining in contact with the bead of the tire results in an increase in the volume of the free area of the lining in contact with the pneumatic cavity.

Various illustrative, nonlimitative embodiments of the invention are shown in the drawing which will make it possible easily to understand the invention. In the drawing:

FIGS. 1 and 2 are cross sections through wheel rims in accordance with the invention, the lateral well being provided with its lining, the tire being mounted in the case of FIG. 1, FIG. 3 shows in cross section the behavior of the lining of FIG. 1 in case of attempt at loosening of the bead, FIGS. 4 and 5 illustrate by way of example cross sections of lateral mounting wells in accordance with the invention, and FIG. 6 shows a lining in accordance with the invention provided with an inflation valve.

Referring to FIG. 1, there is shown in radial cross section a rim 1 provided with an annular lining 2, the tire, of which only the beads 3 and 4 are shown, being mounted on this rim in accordance with the invention. The rim 1 has a base 5, two bead seats 6 and 11, one, 11, formed by a part of the lining 2, a mounting well 8 and two flanges 9 and 10. The mounting well 8 is adjacent the flange 9 and constitutes an extension thereof in the direction towards the rim base 5.

The radially outer face 11 of the lining 2 before the implacement of the bead 3 is shown in dashed line, while its position after the implacement of the bead 3 and the inflation of the tire is shown in solid line 12. The radially inner face 22 is not as wide as the radially outer face 11. The lining 2 applies itself against the inner wall 13 of the well 8. Its radially outer face 11 has two zones, one, 14, forming the seat of the bead 3 and the other zone, 15, extending the lining to the rim base 5 and which, under the effect of the wedging of the bead 3, forms a protuberance which opposes the loosening of the bead. In order to prevent the lining from turning on itself, the bottom of the well 8 is provided with circumferential striations 16.

FIG. 2 shows in part a rim 1 provided with a lining 2 having the shape of an L lying on its side, the tire not being mounted. As in the case of the lining of FIG. 1, the radially outer face 11 is wider than the radially inner face 22. In the example of FIG. 2, the area of contact of the lining 2 with the well 8 is considerably increased. Furthermore, this variant imparts an additional rib 26 to the rim 1 near the flange 9. A lining of this type made of rubber used in combination with a 165 × 380 tire withstands ejection by the centrifugal force in the pneumatic cavity up to a speed of more than 260 km/hr. If one takes care to provide the wall of the well 8 which is in contact with the lining 2 with circumferential groovings, the speed of ejection is increased to more than 330 km/hr. Furthermore, such a lining 2 will, for instance at 160 km/hr, supply an additional pressure equal to 2 daN per cm, wedging the bead tight.

In general, it is advisable to use a lining whose cross section has its center of gravity located radially and axially below the bead of the tire. Such a lining 2 can, for instance, be formed of two rings 24 and 25 adhering to each other and made of two different materials, for instance a rubber and a plastic.

FIG. 3 shows what happens when, for instance upon a turn, the bead 3 of the tire bends on its seat formed by a portion of the radially outer face 11 of the lining 2 in accordance with the invention. (In this figure the dashed line 11 represents the radially outer face of the lining 2 before the mounting of the tire of which only the bead 3 is shown). It can be seen that the tip 31 of this bead then digs itself deeper into the lining 2 which is compressed in this zone. The volume of this lining being noncompressible, a protuberance 15' is formed just opposite the tip 31, this favoring the retention of the bead on its seat and the tightness of the pneumatic enclosure.

FIGS. 4 and 5 show other profiles of mounting wells in accordance with the invention.

FIG. 6 shows a lining 2 in accordance with the invention provided with an inflation valve 61.

The mounting of a tire on a rim in accordance with the invention is simple. Referring to FIG. 1, the bead 4 first of all is passed over the rim flange 9, with the aid of the mounting well 8, and the bead 4 is pushed on to the rim base 5. Thereupon one proceeds in the same manner with the bead 3. Thirdly, the lining 2 is passed over the flange 9. The lining 2 easily takes its place in the well 8 due to its flexibility and stretchability. Ordinarily the circumferential development of the well 8 is slightly greater than the development of the lining 2. Finally, the beads 3 and 4 are put in place on their seats 6 and 11 by producing air pressure in the tire.

What is claimed is:

1. A wheel rim having a base and two seats for tire beads, each seat being extended by a flange, and provided with a mounting well adjacent one flange and a removable annular device filling the well, characterized by the fact that:
   a. the mounting well is contiguous one of the flanges and forms an extension thereof,
   b. the annular filling device is a stretchable flexible lining having a radial profile such that the lining applies itself against the walls of the mounting well and forms the seat for a tire bead and an extension of this seat to the rim base, and that at least the bead seat and its extension which are formed by the lining are compressible without variation in the total volume of the lining.

2. The wheel rim according to claim 1, characterized by the fact that the mounting well has a radial profile with an axial width increasing from the bottom of the well towards the bead seat.

3. The wheel rim according to claim 1, characterized by the fact that the mounting well has means for preventing the lining from turning on itself.

4. The wheel rim according to claim 3, characterized by the fact that the said means are formed of circumferential striations on the wall of the well in contact with the lining.

5. The wheel rim according to claim 1, characterized by the fact that the lining has a cross section in the shape of an L lying on its side, and that the well has an additional rib near the rim flange adjacent the well.

6. The wheel rim according to claim 1, characterized by the fact that the lining has a cross section such that its center of gravity is located radially and axially below the bead of the tire.

7. The wheel rim according to claim 1, characterized by the fact that the lining has a larger developed circumferential length than the developed length of the base of the bead of the tire and, after mounting and inflation of the tire, forms a circumferential protuberance in the zone located between the bead of the tire and the opposite wall of the well.

8. The wheel rim according to claim 1, characterized by the fact that the lining forms a sealing joint between the tire and the rim.

9. The wheel rim according to claim 1, characterized by the fact that the lining consists of a single piece of rubber.

* * * * *